(12) United States Patent
Thomas et al.

(10) Patent No.: US 12,233,347 B2
(45) Date of Patent: Feb. 25, 2025

(54) TARGET GAME DEVICE

(71) Applicant: ELEVEN DIGITAL LTD. CO., Alpharetta, GA (US)

(72) Inventors: Nick B Thomas, Alpharetta, GA (US); Cameron Thomas, North Logan, UT (US); Anthony Ellsworth, Norcross, GA (US); Joshua Jameson, Acworth, GA (US)

(73) Assignee: ELEVEN DIGITAL LTD CO., Alpharetta, GA (US)

( * ) Notice: Subject to any disclaimer, the term of this patent is extended or adjusted under 35 U.S.C. 154(b) by 510 days.

(21) Appl. No.: 17/505,238

(22) Filed: Oct. 19, 2021

(65) Prior Publication Data

US 2022/0288485 A1    Sep. 15, 2022

Related U.S. Application Data

(60) Provisional application No. 63/204,690, filed on Mar. 12, 2021.

(51) Int. Cl.
| | | |
|---|---|---|
| *A63F 9/00* | (2006.01) | |
| *A47K 11/04* | (2006.01) | |
| *A63F 9/02* | (2006.01) | |
| *A63F 9/24* | (2006.01) | |
| *G09B 19/00* | (2006.01) | |

(52) U.S. Cl.
CPC ............ *A63F 9/001* (2013.01); *A63F 9/0243* (2013.01); *A63F 9/24* (2013.01); *A47K 11/04* (2013.01); *A63F 2009/0012* (2013.01); *A63F 2009/2402* (2013.01); *A63F 2009/2442* (2013.01); *A63F 2009/2457* (2013.01); *A63F 2009/247* (2013.01); *A63F 2009/2494* (2013.01); *G09B 19/0076* (2013.01)

(58) Field of Classification Search
CPC .......... A63F 9/001; A63F 9/0243; A63F 9/24; A63F 2009/0012; A63F 2009/2402; A63F 2009/2442; A63F 2009/2457; A63F 2009/247; A63F 9/0204; A47K 11/04
See application file for complete search history.

(56) References Cited

U.S. PATENT DOCUMENTS

| | | | |
|---|---|---|---|
| 2,703,407 A * | 3/1955 | Henoch | A47K 17/00 248/205.5 |
| 5,890,242 A | 4/1999 | Minter | |
| 5,926,867 A | 7/1999 | Buchanan | |
| 6,385,796 B1 | 5/2002 | Muir, Jr. | |
| 6,513,173 B1 | 2/2003 | Sykes | |
| 6,772,454 B1 * | 8/2004 | Barry | A47K 11/04 4/661 |
| 6,908,392 B2 | 6/2005 | Friedman et al. | |
| 7,353,549 B2 * | 4/2008 | Muir, Jr. | A47K 13/24 4/661 |

(Continued)

OTHER PUBLICATIONS

Chris Valentine, "Toylet—The Japanese Toilet Game," odd culture. com Because Normal is Boring . . . , 2013.

*Primary Examiner* — Michael D Dennis
(74) *Attorney, Agent, or Firm* — Roberto M. Suarez

(57) ABSTRACT

A target game device for use in conjunction with a toilet includes a target portion with sensors to detect a urine stream and logic to allocate points based on accuracy. A user interface provides engaging and entertaining feedback to motivate users to improve their aim.

4 Claims, 10 Drawing Sheets

(56) References Cited

U.S. PATENT DOCUMENTS

| | | | | |
|---|---|---|---|---|
| 7,566,060 | B1* | 7/2009 | Breslow | G07F 17/3297 |
| | | | | 273/342 |
| 8,544,341 | B2 | 10/2013 | Grumbles et al. | |
| 8,719,972 | B1* | 5/2014 | Baker | A47K 17/00 |
| | | | | 4/300.3 |
| 9,550,115 | B2 | 1/2017 | Silva | |
| 10,278,553 | B2 | 5/2019 | Barringer | |
| 10,779,694 | B1 | 9/2020 | Walker | |
| 2003/0035302 | A1* | 2/2003 | Friedman | A47K 11/00 |
| | | | | 4/661 |
| 2011/0318720 | A1* | 12/2011 | Giard | A47K 17/00 |
| | | | | 434/258 |
| 2012/0267856 | A1 | 10/2012 | Swan et al. | |
| 2014/0127657 | A1 | 5/2014 | Traxler | |

\* cited by examiner

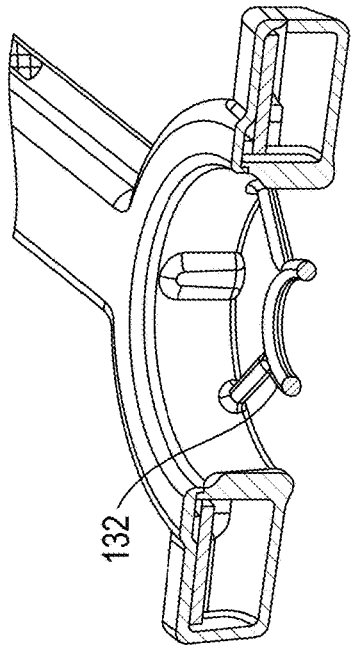
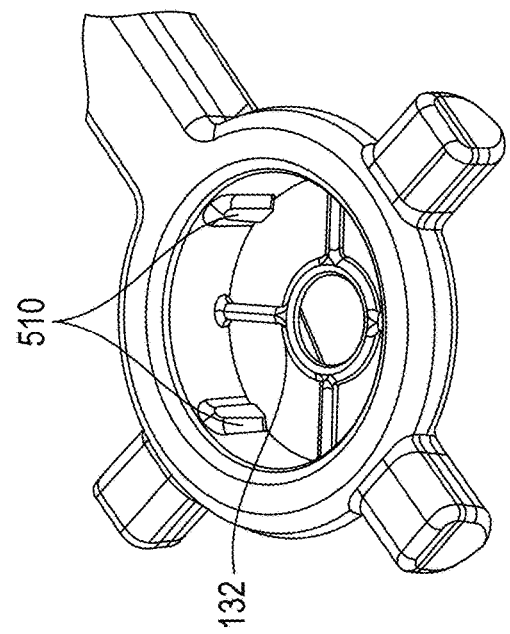
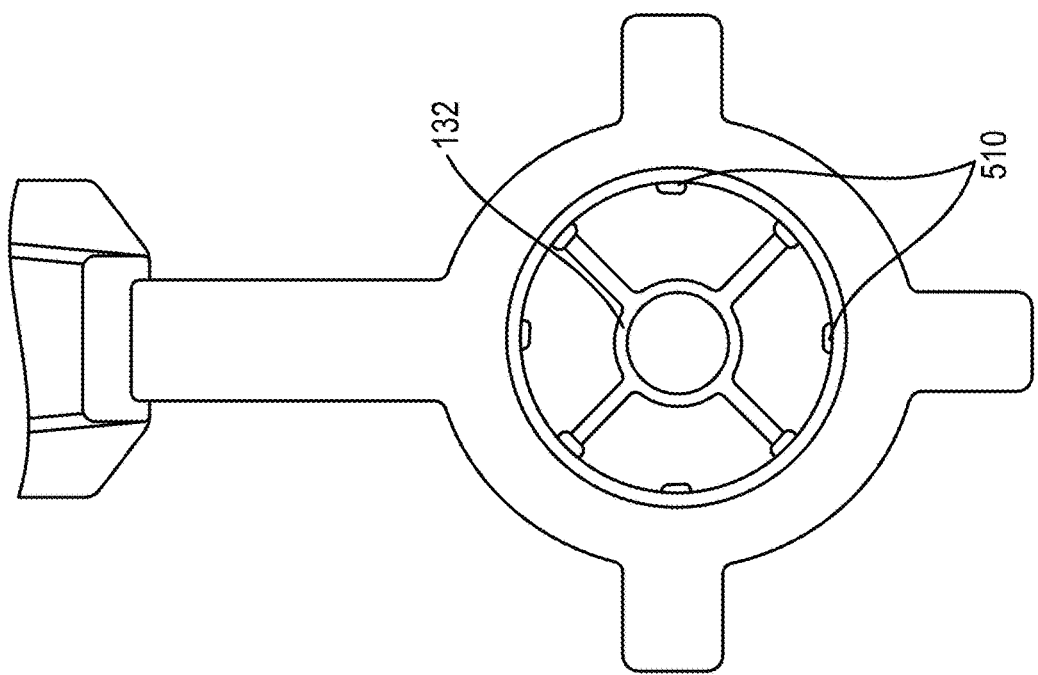

TARGET GAME DEVICE

CROSS-REFERENCE TO RELATED APPLICATIONS

This application is a non-provisional of, and claims priority to, U.S. Patent Application Ser. No. 63/204,690, titled "Wiz Hero," filed on Oct. 19, 2020; which application is incorporated by reference herein in its entirety.

FIELD OF THE INVENTION

The present invention generally relates to a target game device and more specifically relates to a target game device for use with a toilet.

BACKGROUND OF THE INVENTION

Everyone uses a toilet multiple times each day. Males usually eliminate liquid while standing and the toilet seat often becomes the center of contentious debate among people who live together—"leave the seat up," or "leave the seat down." Cleanliness in and around a toilet is important, but not always easy to achieve. The way our body communicates that we need to urinate is through a build-up of pressure in our bladder. It is often difficult to control a urine stream while standing above a toilet, especially when the contents are under pressure. Recent studies show an increase in kidney and prostate problems from 'holding-it'. Despite the pressure of a full bladder, stopping our activities to go to the bathroom is often an unpleasant chore.

There is currently no satisfactory device in the market that is designed to engage a male to "aim and shoot" during urination. There is likewise, no satisfactory device in the market that promotes raising the toilet seat prior to male urination, or to lower the seat once completed.

There exists, therefore, a need for a device to overcome the above-stated shortcomings of the known art.

SUMMARY OF THE INVENTION

Briefly, according to an embodiment, the target game device is comprised of three main components: an attachment portion, a target portion, and a logic portion. The three main components are related as follows:

The attachment portion is a rigid structure that is configured to removably mount, or attach, the device to a secure sub-structure.

The target portion is a structure having a length and a proximal end and a distal end that is pivotably attached at the proximal end to the attachment portion. Pivotable between two positions, the target portion is preferably mechanically biased to one of the two position. The distal end of the target portion is configured with a sensor array and a visual target indicator, such as a bullseye, crosshairs, a reticule, or other similar visual target indicator.

The logic portion is coupled with the attachment portion and is electrically communicative with the sensor array of the target portion. The logic portion includes a power supply, a logic subsystem, and a user interface. The power supply may be one or more batteries or a power circuit adapted to receive household current. The logic subsystem includes one or more microprocessors that are configured to receive and process input from the sensor array. The user interface provides visual and/or audible signals to a user and may also be configured to receive input from a user via physical buttons, a touch pane, or other input device.

Further embodiments of the present invention include a system comprising: a device having an attachment portion, a target portion, and a logic portion; and a toilet with a bowl and a toilet seat attached to the bowl with toilet seat hardware; where the device is configured to be mounted to a toilet such that the attachment portion is maintained in mated relation to the toilet bowl by the toilet seat and toilet seat hardware, the target portion is configured to be within the bowl and the logic portion is configured to be outside of the bowl, and further configured such that raising and lowering of the toilet seat causes a pivoting of the target portion from a first position relative to the raised toilet seat and a second position relative to the lowered toilet seat.

Yet another embodiment of the present invention relates to a method of using the target game device within the context of the system described above. Method steps of this embodiment of the invention include: providing a target game device having an attachment portion, a target portion, and a logic portion; providing a toilet having a bowl and a seat with attachment hardware; installing the target game device onto the toilet such that the attachment portion of the target game device is in mated relation to the bowl and constrained by the seat and the attachment hardware; raising of the toilet seat whereby the target portion moves into a first, approximately horizontal, position; providing a stream of urine through the target portion; detecting by the sensor array the stream of urine through the target portion; communicating by the sensor array to the logic portion the presence of the urine stream; processing by the logic portion the communication received from the sensor array; and, in response to the communication received from the sensor array, activating by the logic portion of the user interface.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which:

FIG. 5A shows a view of the target ring;

FIG. 5B shows a view of a cut section of the target ring;

FIG. 5C shows an isometric view of the target ring;

Figure 1:
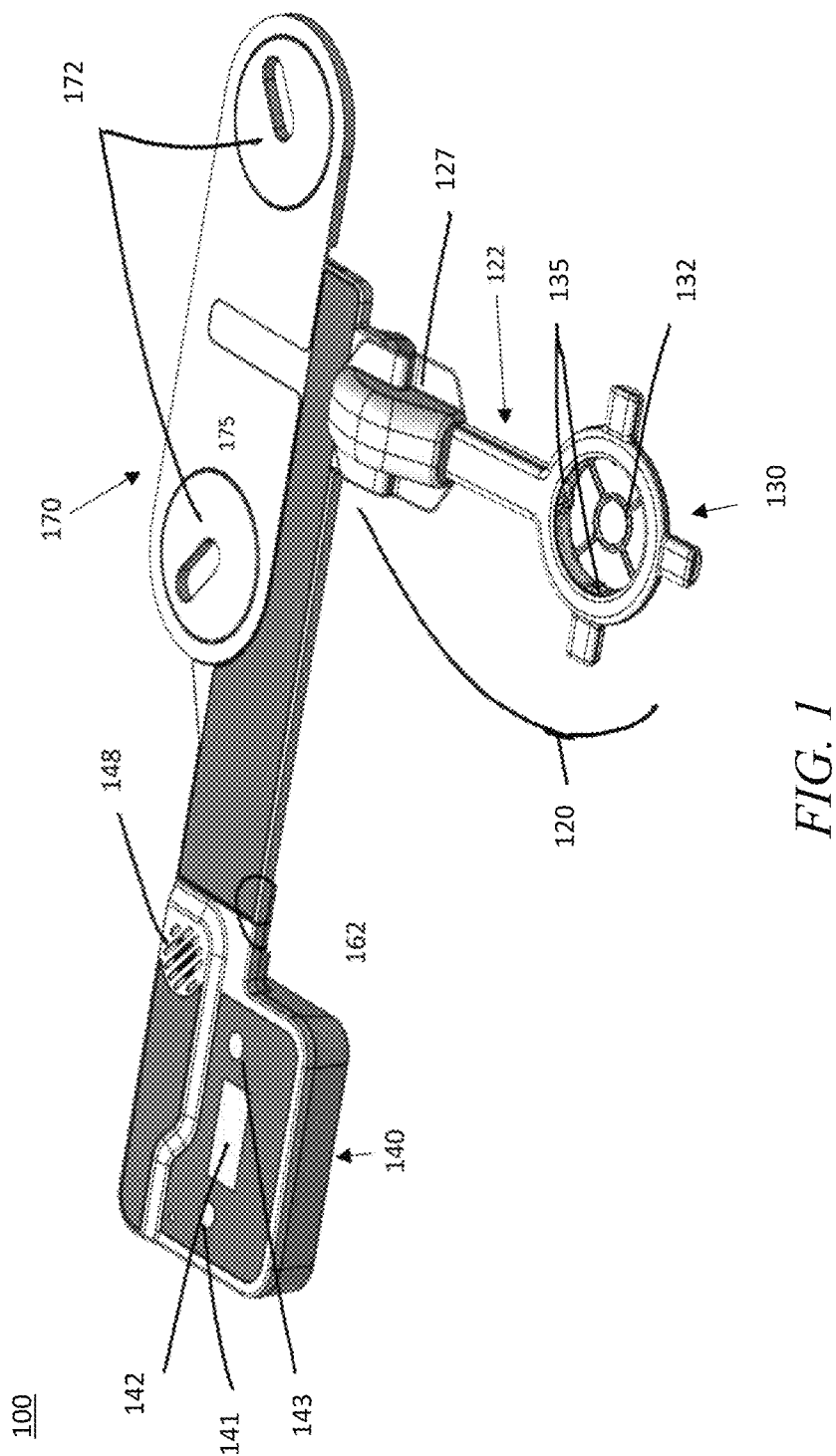
FIG. 1 is a top isometric view of the full assembly of the target game device, according to an embodiment.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In a preferred embodiment, we disclose a target game device configured to be installed onto a toilet, for use in conjunction with a toilet. The target game device turns a basic human activity into a fun game that can reduce messy outcomes in the bathroom by offering motivation to aim and to control urine streams. The target game device is so easy and fun to use, it can be part of a child's toilet training, although adults may also find benefits and amusement through its use.

The target game device is a semi-permanent fixture that is configured to attach to a toilet utilizing the toilet's existing toilet seat attachment hardware. Once installed, it is configured so that the device will remain attached to the toilet until removed. The novel design allows the target to remain out of the way when the seat is down, while also swinging up into position—hands-free—when the toilet seat is raised. One with knowledge in the art will appreciate that the target game device can also be implemented with urinals without toilet seats, such as those provided in public toilets.

The Device

Referring now to the drawings in general and to FIG. 1 in particular, the target game device 100 includes an attachment portion 170, a target portion 120, and a logic portion 140.

Figure 6:
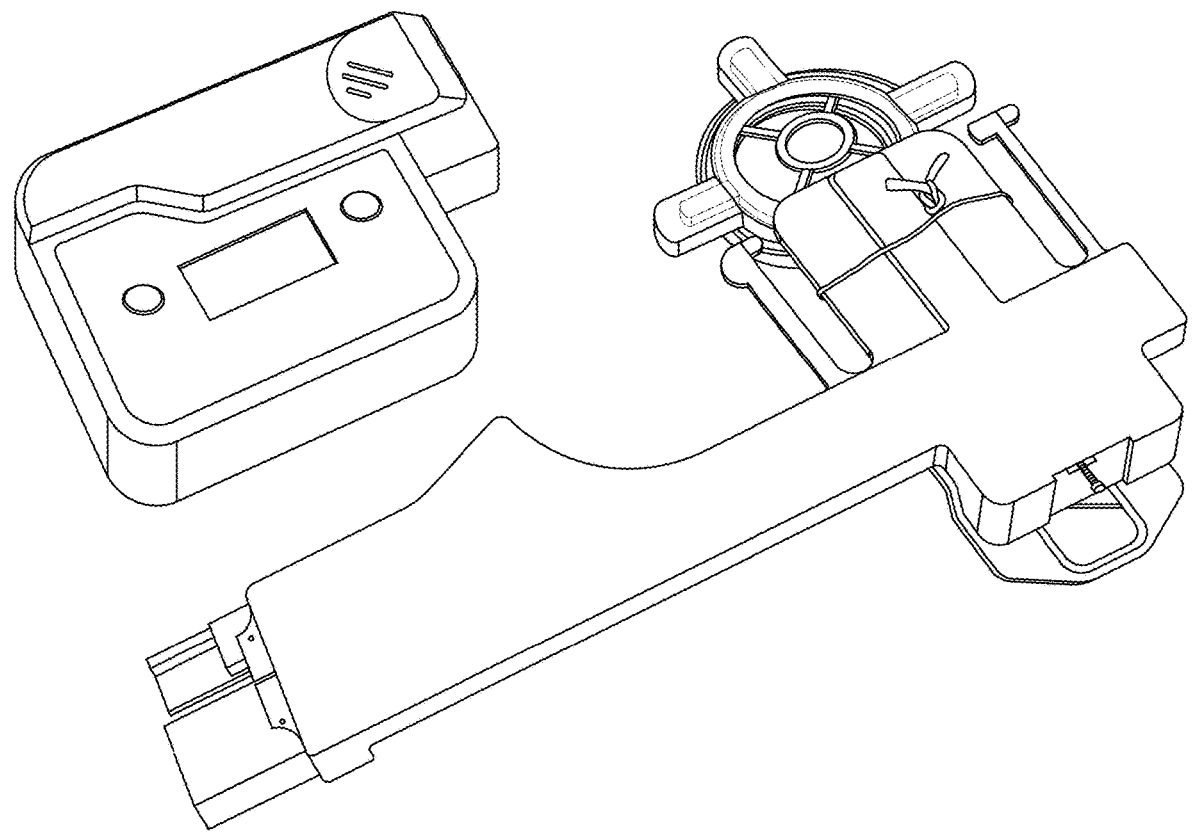
FIG. 6 shows an image of a prototype target game device, configured for shipping.

FIG. 6 shows a prototype of the target game device 100 configured for shipping. The electronics module 140 (containing the batteries, a PCB, speaker 148, and display 142) is configured to be physically detachable and the retractable arm 122 folds up.

The Attachment Portion 170

Figure 2:
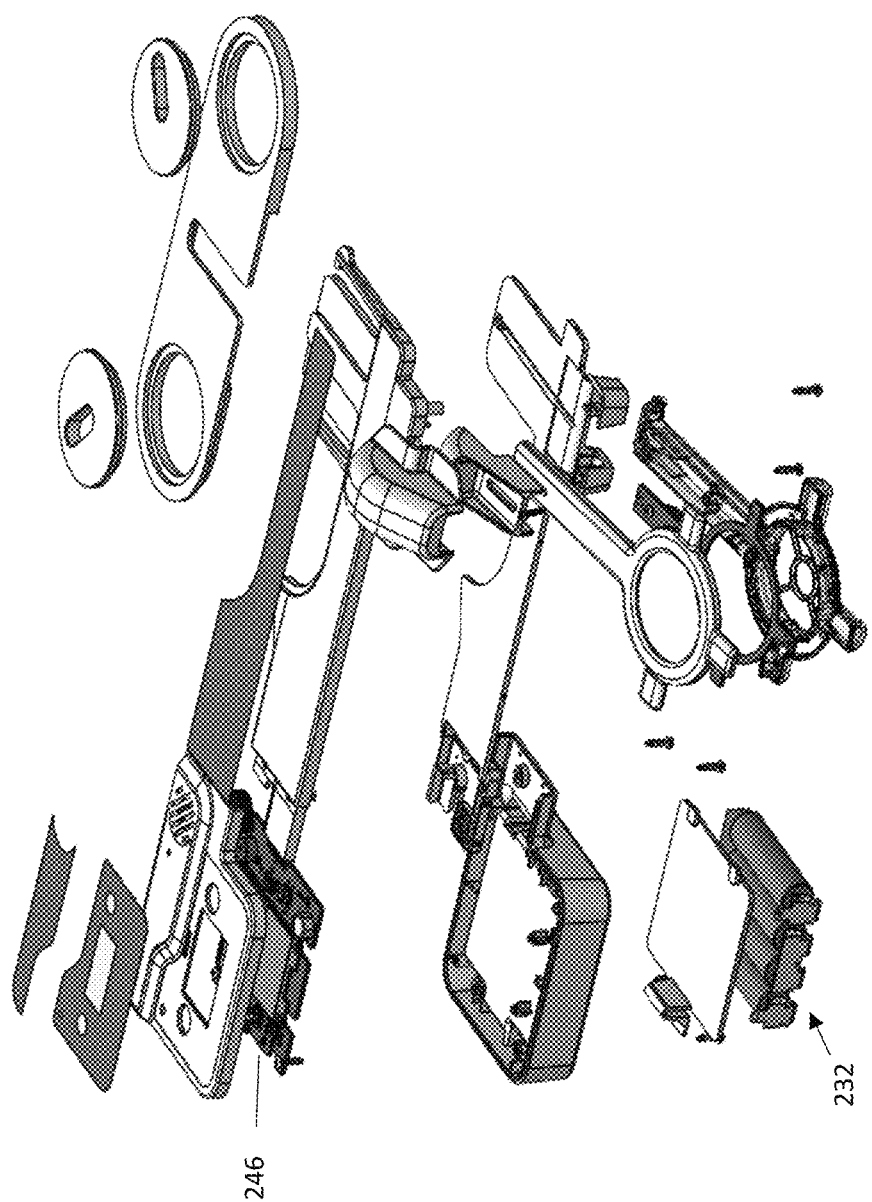
FIG. 2 shows an exploded view of the target game device of FIG. 1, according to an embodiment.

In one embodiment as shown here in FIGS. 1 and 2, the target game device 100 is configured to be attached to a toilet via the attachment portion 170. The attachment portion includes a substantially flat attachment plate 175 and a mechanical connection structure 162. The attachment plate 175 is configured to receive one or more installation washers 172. The attachment plate 175 also has a receiver slot configured to receive, in inserted relation, a mated keyed protrusion disposed on the mechanical connection structure 162.

The toilet seat installation washers 172, are located within the attachment portion 170 of the target game device 100 and include a slotted hole that extends radially out from approximately the center of the washer 172 to near the outer edge of the washer 172. This configuration, as illustrated in FIG. 1 and FIG. 2, allows each of the washers 172 to rotate independently, thereby allowing the attachment portion 170 of the device to adjust and interface with the toilet seat attachment hardware even in a variety of attachment configurations.

An embodiment of the disclosure utilizes a mechanical connection 162 that allows for quick installation and removal to facilitate cleaning. As shown in FIG. 2, the attachment portion 170 is further comprised of an attachment subassembly having a one or more attachment point and a receiver, and a detachable subassembly to which the target portion 120 and the logic portion 140 are attached, having a protrusion portion configured to mate in inserted relation with the receiver, whereby the detachable subassembly, including the target portion 120 and the logic portion 140, may be selectively separated from the attachment subassembly.

The target portion 120 and the logic portion 140 are configured to attach to the mechanical connection structure 162. In this way, once the attachment portion 170 is installed on a toilet via the attachment plate 175 and the installation washers 172, the sub-assembly of the mechanical connection structure 162 with the target portion 120 and the logic portion 140 attached, can be easily removed from the attachment plate, such as for cleaning, and then re-attached to the attachment plate for continued use.

The Target Portion 120

The target portion 120 includes a retractable arm 122 with a proximal end and a distal end, and is configured to raise and lower. The retractable arm 122 is pivotably attached to the mechanical connection structure 162 and is pivotable between a first position and a second position. The retractable arm 122 includes an adjustable cam cover 127 disposed near the proximal end, which is configured to pivot between the first position and the second position by interaction with a toilet seat (not shown in FIG. 1, please refer to FIG. 7 (first position) and 8 (second position), once installed. When the toilet seat is lifted, the retractable arm 122 of the device 100 raises, thus triggering the device 100 to power on automatically. The retractable arm 122 prevents the device 100 from being intrusive when not in-use and also helps keep the device 100 clean from debris.

An adjustable cam cover 127 is shown. The target game device 100 has a retractable arm 122 that raises and lowers with the toilet seat. In the embodiment shown, a spring is configured to pull the target arm 122 up into the "deployed" position. The cam feature 127 is configured to contact the underside of a toilet seat to push the target arm 122 down when the seat is down. The position of this cam feature 127 can be adjusted when installed on the toilet to accommodate different toilet geometries. A sensor within the retractable arm 122 detects the orientation of the retractable arm 122 and automatically powers on the device 100, with a time-out sensor to power-off the device 100. In an embodiment, a gravity tilt switch 330 is used, however, other sensors could be used including a limit switch, reed switch, hall-effect sensor or infrared sensor.

Located at the distal end of the retractable arm 122 is a target ring assembly 130 with translucent cross hairs 132. This target ring assembly 130 houses multiple laser diode sensors 135. The lasers 135 reflect off the translucent target 132 to illuminate the assembly 130. In one embodiment, photosensitive sensors (shown in FIG. 3) positioned on the other side of the of the target ring 130 from the laser diodes 135, detect the shadow cast by a stream of urine flowing through the target ring 130. The plastic housing of the target ring 130 is translucent so that the laser light transmits through the housing to communicate with the corresponding photosensor on the opposite side of the ring 130. In the embodiment shown, two sets of laser diode sensors 135, positioned perpendicular to each other, are used. Both sets of sensors 135 are aimed at the center of the target 132 such that when both sensors 135 detect the urine stream, the stream's location is determined to be at the center of the target 132, known as "bullseye". Alternative embodiments can use capacitive sensing or resistive sensing to detect the urine stream.

Referring to FIG. 2, there is shown an exploded view of the target game device 100, according to an embodiment. The embodiment shown in FIG. 2 is powered by four AA batteries 232, but other battery types and/or configurations could be used, including rechargeable batteries.

Figure 3:
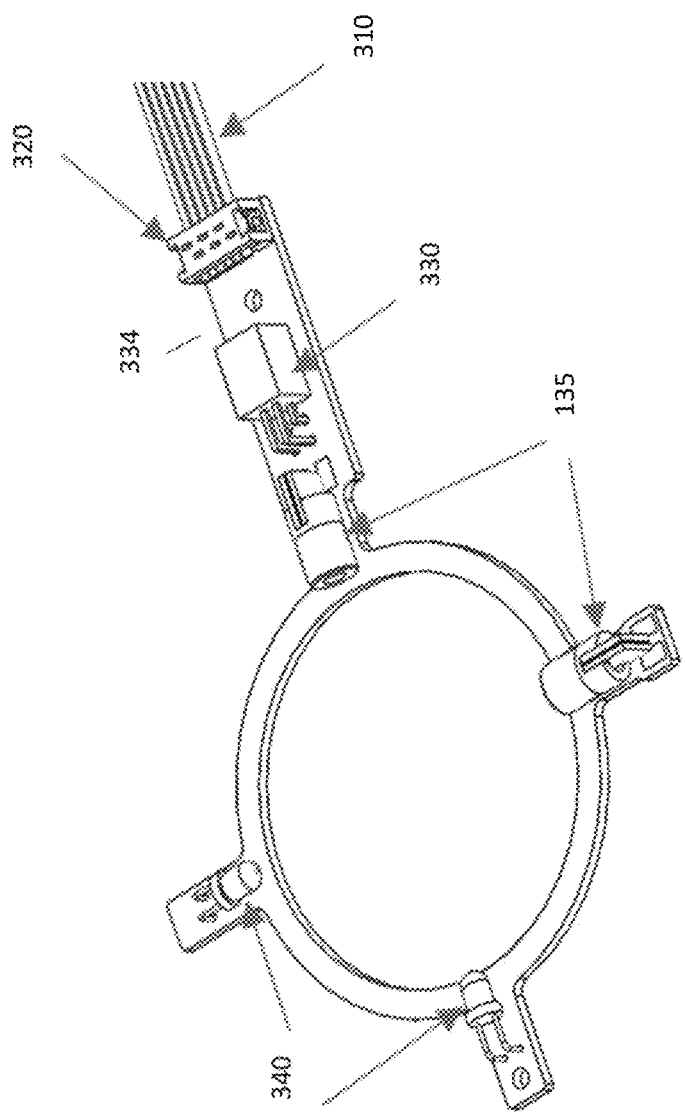
FIG. 3 shows an isometric view of the sensor sub-assembly of the target game device, according to an embodiment.

Referring now to FIG. 3, we show a diagram of the inside components of the target ring 130 assembly housing a printed circuit board (PCB) 334. The ribbon cable 310 is attached to the target ring 130 by a connector 320. The board 334 also has a tilt sensor 330. Phototransistors 340 are positioned across from the laser diode sensors 135.

Figure 4:
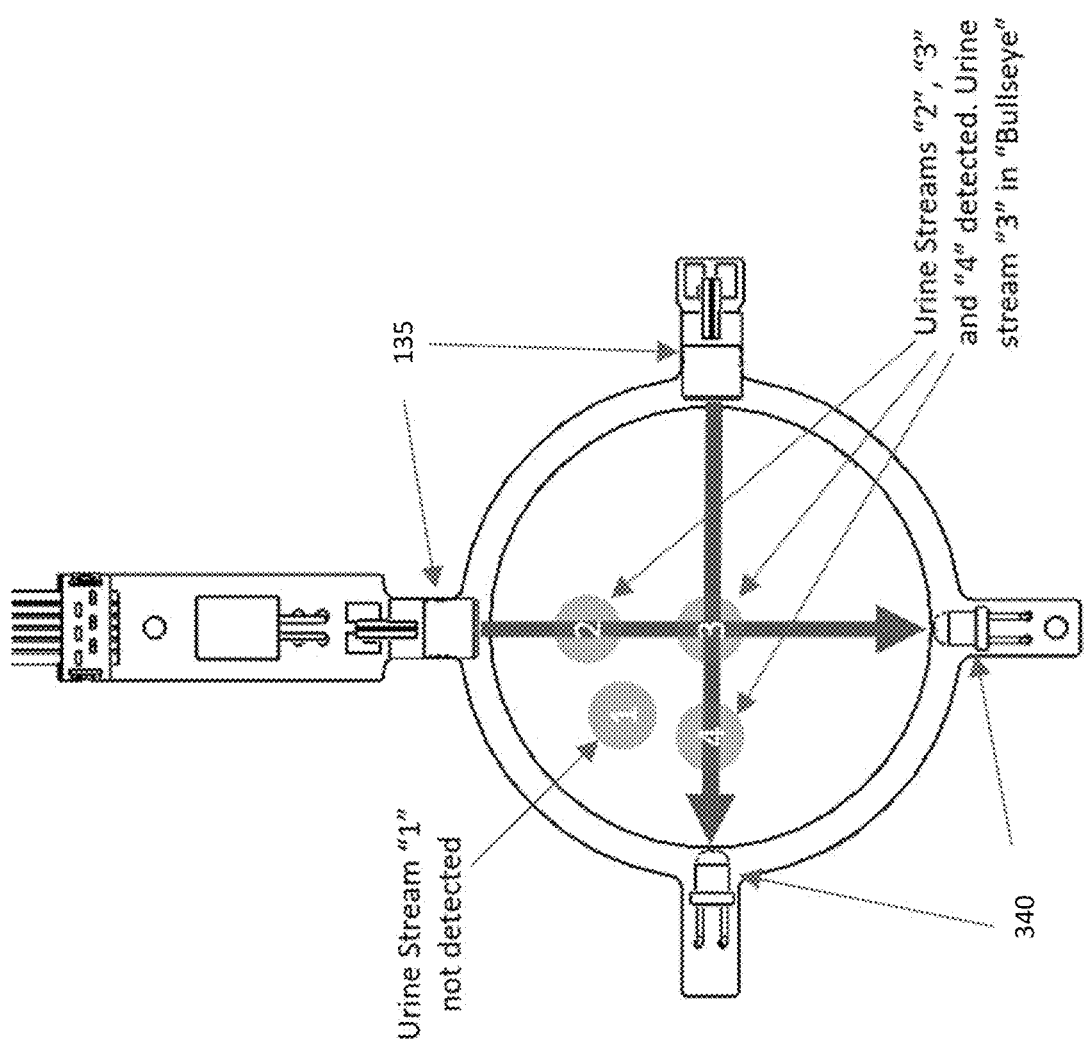
FIG. 4 shows a top diagrammatic view of the sensor sub-assembly of FIG. 3, according to an embodiment.

FIG. 4 shows how the sensor configuration is implemented to detect a urine stream and influence the score. The circles labelled "1," "2," "3," and "4" represent points at which a urine stream passes through the crosshairs 132 of the target ring 130. Urine streams "2," "3," and "4" are detected by the sensors 135; however urine stream "1" is not detected. Urine stream "3" is in the bullseye of the target ring 130.

FIG. 5A shows an image of a target ring 130, according to an embodiment. To reliably detect urine flow, specific geometric features of the target ring 130 help to keep liquid droplets from forming and interfering with the line of sight between the laser diode emitter and detector. Illuminated cross hairs 132 (used for aesthetic reasons) are rotated away from the sensor components to help eliminate surfaces to which liquid could cling around the sensor components 135. Their positioning also illuminates the laser's projections without liquid interfering with the line of sight. For example, the section of the cross-hair is rounded to prevent large droplets from remaining on top of the crosshairs and interfering with the sensor.

Protrusions 510 on the exterior surface directly in front of the sensor components help to shed water away from the line-of-sight between the components, preventing interference from stationary liquid droplets. FIG. 5B shows a cut-away section of the target ring 130 and FIG. 5C shows an isometric view of the target ring 130, according to an embodiment.

A user standing over the toilet with the seat lifted will see an illuminated target 130 to aim at. When the laser sensors 135 detect the urine stream, the device calculates a numeric score based on the accuracy and the duration of the stream.

The Logic Portion 140

The logic portion 140 of the device 100 is in electrical communication with the target portion 120. The logic portion 140 is comprised of at least an electronics module 140. The electronics module 140 includes a power supply such as batteries 232, a one or more microprocessor (not shown), and a user interface. The electronics module 140 PCB 246 is shown in FIG. 2. The user interface may include one or more of the following: a manual power button 141, a mute button 143, a digital display 142, or a speaker 148. A numeric score may be displayed on a digital display 142 and a speaker 148 may be configured to play sounds that coordinate with the accumulation of points. In embodiments, the microprocessor runs a pre-programmed instruction set where the points add faster as the stream hits the center of the target 132 and additional points are added with the length of uninterrupted stream. After approximately four seconds (the time is configurable) without liquid detection the digital display screen 142 flashes to signal a final score. Once the toilet seat is lowered, the retractable arm 120 retreats to the rear of the bowl and the target game device 100 shuts down within about 30 seconds to conserve power.

In addition to the physical features of the target game device 100, an algorithm implemented in firmware is configured to run on the microprocessor to filter out sensor input from stationary objects that may be influencing the sensor readings. The algorithm works by looking at rapid transitions in the sensor's values that are characteristically turbulent of urine as it flows through the target ring and detected by the sensor. In this way, stationary liquid or other objects are filtered out in software and not counted as part of the game's score.

The embodiment shown in FIG. 6 is powered by four AA batteries 232 but other battery types and/or configurations could be used, including rechargeable batteries.

In embodiments, the electronics module may additionally comprise a wireless communication module. In this way, the target game device 100 can be wirelessly connected to a smart phone app with WiFi, Bluetooth or other wireless protocol to add additional features and functionality, such as keeping records of scores and time logs and sharing challenges with other users.

In another embodiment, a nightlight can be implemented within the target game device 100. The nightlight can be triggered by a photosensor, a timer, or via a setting in the logic portion 140.

The System

Figure 8:
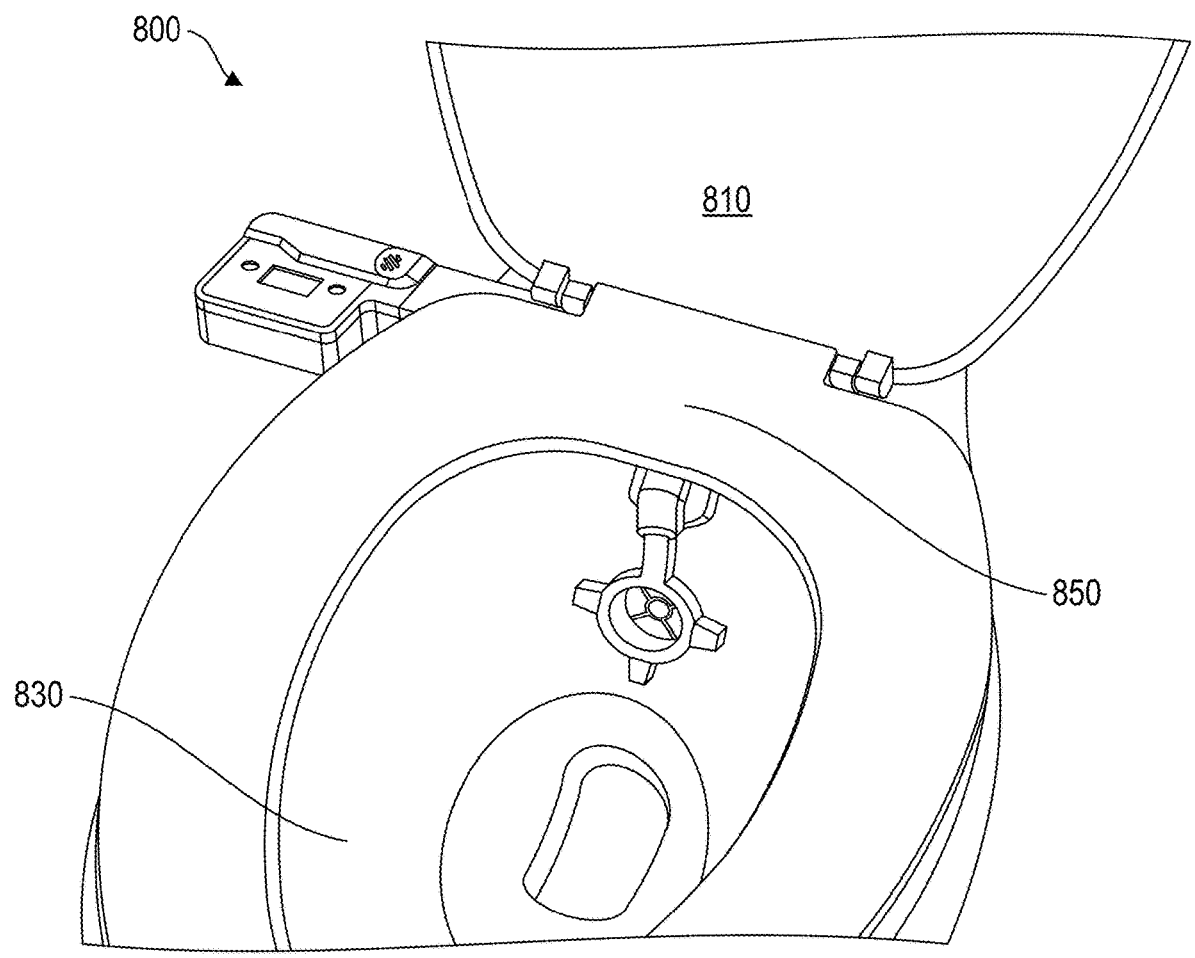
FIG. 8 shows an image of the prototype installed on a toilet in the OFF position, according to an embodiment.
Figure 9:
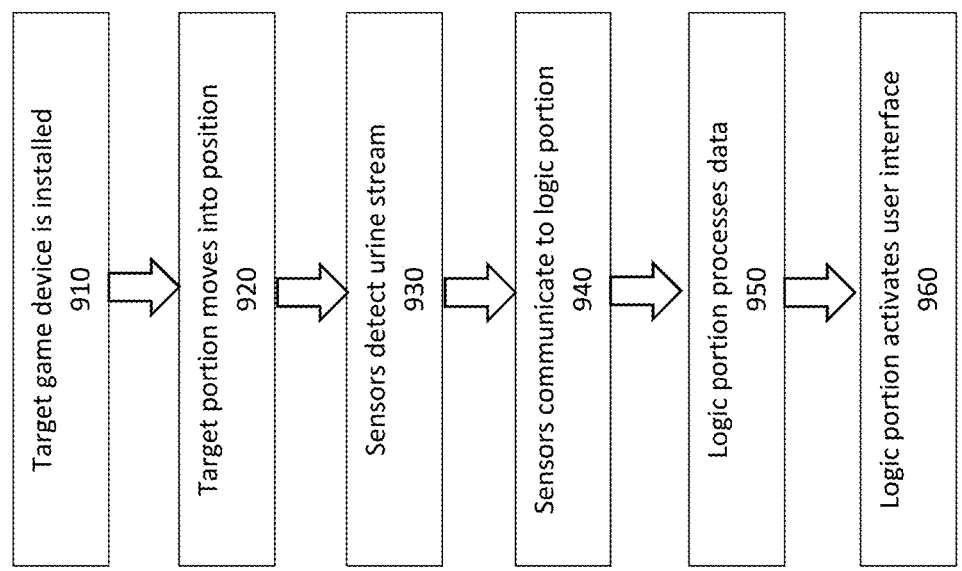
FIG. 9 shows a high level process flow diagram of the method steps according to an embodiment of the present invention.

Referring to FIGS. 8 and 9, an embodiment of the present invention is a system 800 that includes the target game device 100 as described above, installed together with a toilet 810 having a bowl 830, a seat 850 and attachment hardware (not visible in the figures). In the system 800, the target game device 100 is assembled onto the toilet 810 such that the attachment portion 170 of the device is mated to the toilet bowl 830. The toilet seat attachment hardware transverses through the seat installation washers 172 and is insertedly connected to the toilet seat 850 whereby the toilet seat 850 and the toilet bowl 830 sandwiches the device 100 there between. When properly assembled, the device is configured in the system 800 such that the electronics module 140 is outside of the toilet bowl 830 and the retractable arm 122 is within the toilet bowl 830.

Figure 7:
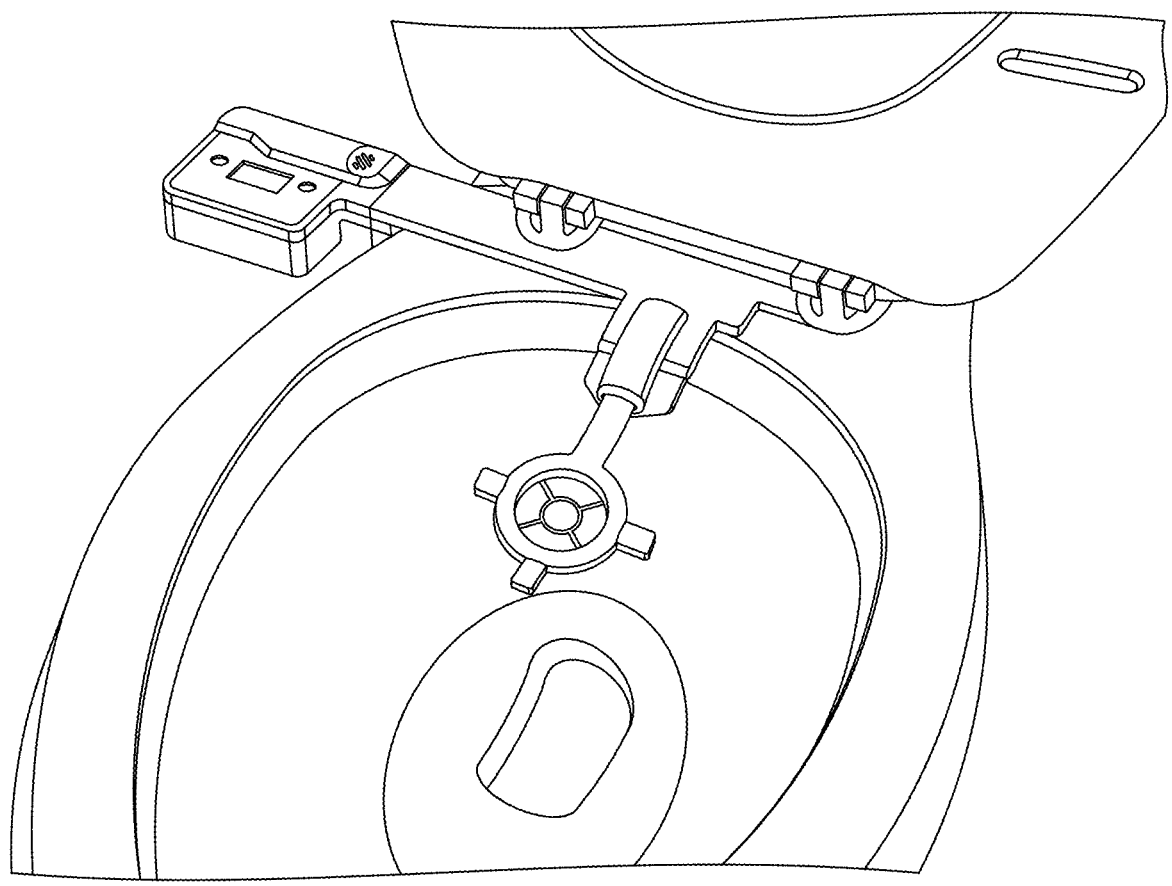
FIG. 7 shows an image of the prototype of FIG. 6 installed on a toilet in the ON position, according to an embodiment.

FIG. 7 shows an image of the same prototype shown in FIG. 6 installed on a toilet. The target game device 100 is installed between the toilet seat and the toilet bowl. In the image of FIG. 7 the target game device 100 is ON and ready to start scoring. The retractable arm 122 is mechanically biased (such as with a spring) to remain in this raised position, approximately horizontal, until the toilet seat pushes down on the cam 127 thereby moving the retractable arm 122 into an approximately vertical position, out of the way into the toilet bowl as is shown in FIG. 8.

FIG. 8 shows the target game device 100 in the OFF position. When the toilet seat is lowered, the device turns OFF because the toilet seat pushes down on the cam feature 172 on the retractable arm 122 and keeps it down.

The Method

Referring now to FIG. 9, a method 900 of using the target game device 100 within the context of the system 800 is disclosed. Method steps of this embodiment of the invention include: providing a target game device having an attachment portion, a target portion, and a logic portion; providing a toilet having a bowl and a seat with attachment hardware; installing the target game device onto the toilet such that the attachment portion of the target game device is in mated relation to the bowl and constrained by the seat and the attachment hardware 910.

Next, in step 920; the target portion 130 of the device 100 moves into a first, approximately horizontal, position, responsive to raising of the toilet seat. In step 930 the sensor array detects a stream of urine through the target ring 130.

In step 940 the data detected by the sensors is communicated to the logic portion, indicating the presence of a urine stream, for processing by the logic portion in step 950; and, in response to the communication received from the sensor array, activating by the logic portion of the user interface 960 to show a score, play sounds, lights, and other feedback.

Scoring Method

The target game device 100 has a unique scoring system that is based on flow, accuracy, and duration of the urine stream. In the preferred embodiment, points are accumulated when either of the two perpendicularly aligned sensors detects the urine stream. If both detect the urine stream at the same time (a "bullseye"), additional points are accumulated. The amount of time this "bullseye" condition is counted and once a certain time is achieved, bonus points are awarded. Other scoring schemes could be utilized.

Figure 10:
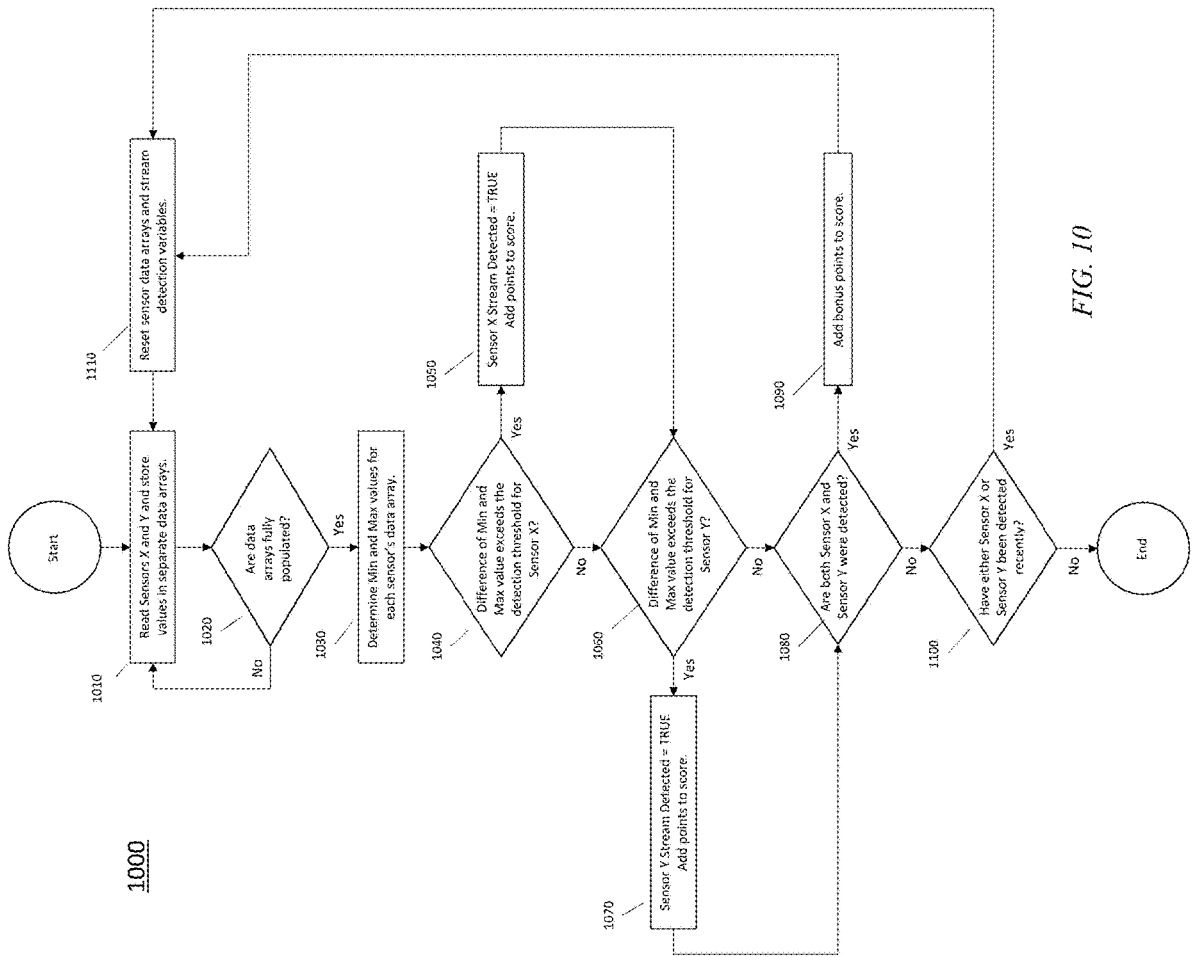
FIG. 10 is an operational flow diagram of the method of determining the presence and location of the urine stream, according to an embodiment.

Referring now to FIG. 10, there is shown an operational flow diagram 1000 of one algorithm that can be used to determine the presence and location of the urine stream in relation to the target ring 130 and to convert that data into scores. Beginning with step 1010, sensors X and Y are read and the values are stored in separate data arrays. The minimum array size is two. The processing should populate the data arrays and check for detection with a minimum rate of 1 Hz, with a possible speed of 100 Hz or more. Although two sensors are used in this algorithm, only one sensor is required and there can be more than two sensors used. In step 1020 a check is made to determine if the data arrays are fully populated. If the answer is No, the processing loops back to step 1010.

If the answer is Yes, then in step 1030 the Min and Max values for each sensor's data array are determined. If in step 1040 it is determined that the difference of the Min and Max value exceeds the detection threshold for Sensor X, then in step 1050 the value for Sensor X Stream Detected is set to TRUE and points are added to the score. Now the next step is determine if the difference of the Min and Max value exceeds the detection threshold for Sensor Y in step 1060. If the answer is Yes, then in step 1070 the value for Sensor Y Stream Detected is set to TRUE and points are added to the score. In step 1080 both Stream Detected fields are checked. If they are both TRUE, meaning that both Sensors X and Y detected a urine stream, then in step 1090 bonus points are added to the score for a "bullseye." For a visual reference, the urine stream numbered "3" in FIG. 4 is the only one detected by both sensors. The sensor arrays and stream detection variables are reset in step 1110.

If, on the other hand, both Sensors X and Y did not reflect TRUE at the same time, then in step 1100 a query is made to determine if either Sensor X or Sensor Y has been detected recently; in other words, is the urine stream continuing? If the answer is NO, the processing ends. If the answer is YES, the process loops back to step 1110 where the sensor data arrays and stream detection values are reset. The process repeats beginning with step 1010.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims. Modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Components from one embodiment can be combined with another embodiment and remain within the spirit and scope of the invention. Therefore, other embodiments of the present invention are possible without departing from the spirit and scope of the present invention.

The invention claimed is:

1. A target game device, the target game device comprising: an attachment portion that is configured to removably attach the target game device to a sub-structure said attachment portion having one or more installation washers, each comprising a slot extending radially from a center of each washer to near an outer edge of each washer: a target portion having a length, a proximal end, and a distal end, that is pivotably attached to the attachment portion at the proximal end, pivotable relative to the attachment portion between a first position and a second position, and further mechanically biased to either the first position or the second position, and wherein the distal end is configured with a sensor array coupled to a visual target indicator; and a logic portion, having an electronics module including a power supply, a microprocessor, and a user interface, attached to the attachment portion and electronically communicative with the sensor array.

2. The target game device of claim 1 further comprising a cam attached to the target portion near the proximal end, the cam configured to receive a load and translate that load into the target portion thereby pivoting the target portion from the first position to the second position.

3. A target game device, the target game device comprising: an attachment portion that is configured to removably attach the target game device to a sub-structure, wherein the attachment portion further comprises an attachment subassembly having one or more attachment points and a receiver, and a detachable subassembly to which a target portion and a logic portion are attached, wherein the detachable subassembly further comprises a protrusion portion configured to mate in inserted relation with the receiver, whereby the detachable subassembly, including the target portion and the logic portion, may be selectively separated from the attachment subassembly; the target portion having a length, a proximal end, and a distal end, that is pivotably attached to the attachment portion at the proximal end, pivotable relative to the attachment portion between a first position and a second position, and further mechanically biased to either the first position or the second position, and wherein the distal end is configured with a sensor array coupled to a visual target indicator; and the logic portion, having an electronics module including a power supply, a microprocessor, and a user interface, attached to the attachment portion and electronically communicative with the sensor array.

4. The target game device of claim 3 further comprising a cam attached to the target portion near the proximal end, the cam configured to receive a load and translate that load into the target portion thereby pivoting the target portion from the first position to the second position.

* * * * *